United States Patent Office 3,223,682
Patented Dec. 14, 1965

3,223,682
PREPARATION OF LINEAR POLYUREA POLYMERS FROM UREA AND AN ALICYCLIC DIAMINE
Rudolf Gabler, Zollikerberg, Zurich, and Helmut Muller, Oberrieden, Zurich, Switzerland, assignors to W. R. Grace & Co., Cambridge, Mass., a corporation of Connecticut
No Drawing. Filed Nov. 28, 1961, Ser. No. 155,507
Claims priority, application Switzerland Apr. 1, 1958
9 Claims. (Cl. 260—77.5)

This invention relates to linear polymers, and in particular to a process for preparing high molecular weight linear polyurea polymers based on alicyclic diamines.

This application is a continuation-in-part of application Serial No. 800,955, filed on March 23, 1959, now abandoned.

A polyurea is a polymer having the recurring building block $(-R-NH-CO-NH+)_n$. High molecular weight linear polymers of this type should theoretically provide high strength thermoplastic resins useful for a variety of purposes such as fibers, films, and coatings. For this reason a number of theoretical investigations have been made over the years seeking to find a satisfactory synthesis of a useful polyurea resin. As a result of these investigations there are a number of known reactions leading to the formation of linear polyurea resins. These include, for example, a number of addition reactions such as the reaction of a primary or a secondary diamine with a diisocyanate to form a polyurea; the reaction of a diisocyanate with water to form a diamine and a further reaction of this diamine with the diisocyanate to form a polyurea; the reaction of a diazide of a dicarboxylic acid with water to form a diisocyanate which in turn reacts with water to form a polyurea and the polymerization of cyclic urea derivatives in the presence of hydrogen to form a polyurea and a number of condensation reactions such as the condensation of a diamine with urea to form a polyurea; the condensation of a diamine with carbon dioxide to form a polyurea; the condensation of a diamine with a diurethane to form a polyurea; the condensation of a diamine with an alpha-omega-diureide to form a polyurea; the condensation of an alpha-omega-dihalogenparaffin with urea to form a polyurea; the reaction of a diamine with carbonyl sulfide to form an alpha-aminomonodicarbamate which upon heating forms a polyurea; the condensation of an aromatic diamine with phosgene to form a polyurea and the condensation of a diamine with a diester of a carbonic acid.

It is surprising, in view of the number of available syntheses for the formation of polyurea resins, of the number of different people who have investigated these resins, and of the interesting possibilities of resins of this type, that there is at the present time little or no commercial production of polyurea resins. One reason for this is that many of the polyureas, especially those derived from an aromatic diamine or an aromatic diisocyanate have a very high melting point which approaches or even exceeds the decomposition temperature making the further handling of such polymers by the extrusion or molding techniques normally employed for thermoplastic resins extremely difficult or impossible. In addition, many of these polymers are so poorly soluble in ordinary solvents that further working by solution techniques becomes difficult or impossible. In the few instances, where the resulting polyurea polymer has physical properties which make the utilization of the polymer reasonable, difficulty has been experienced for lack of economic sources of the necessary raw materials. For example, it has been reported that the polyurea formed by condensing nonamethylenediamine with urea has good fiber-forming properties and the fibers may be cold-drawn. However, the preparation of nonamethylenediamine appears to be complicated and costly.

We have found that very useful polyurea resins can be formed when the polyurea is derived by condensing urea and an alicyclic diamine of the general formula:

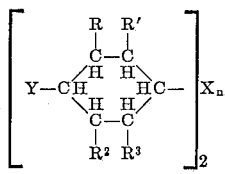

where R, R', $R^2$ and $R^3$ represent substituents selected from the group consisting of hydrogen and a lower alkyl radical having 1 to 4 carbon atoms, n has one of the values 0 and 1, X represents a member selected from the group consisting of alkylene radicals having 1 to 4 carbon atoms, a divalent hetero atom selected from the group consisting of

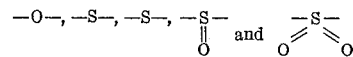

and a cyclohexyl radical having the structure

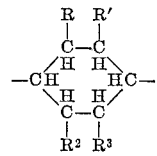

where R, R', $R^2$ and $R^3$ represent the aforementioned substituents, and Y represents the group

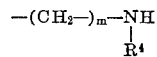

where $R^4$ represents a member selected from the group consisting of hydrogen and a lower alkyl radical having 1 to 4 carbon atoms, and $m$ has one of the values 0, 1, 2 and 3.

The polyurea resins derived from such alicyclic polyamines are of interest not only because of the favorable melting point range and of the excellent resulting physical properties, but especially because of the ease of varying the melting point range and the physical properties either by the selection and location in the molecule of a substituent group other than hydrogen or by the length of the group between the two cyclohexyl groups.

A special advantage of this invention lies in the fact that the alicyclic diamines can be prepared easily and economically by well-known reactions. For example, the 4,4'-diamino-dicyclohexyl-methanes can be prepared by the condensation of an aromatic amine such as aniline with formaldehyde and subsequently hydrogenating the condensate in the presence of a catalyst such as basic cobalt oxide or basic ruthenium oxide. A substituted 4,4'-diaminodicyclohexylmethane can be obtained by substituting the desired homologue of aniline such as toluidine or xylidine for aniline in this reaction.

An alternative method of preparation of the 4,4'-diaminodicyclohexyl alkanes involves a Friedel-Crafts condensation of benzene or a benzene homologue with an alpha-omega-alkyldihalide, nitration of the condensate to the corresponding 4,4'-dinitrodiphenyl alkane and the catalytic hydrogenation of the 4,4'-dinitrodiphenyl alkane to the 4,4'-diaminodicyclohexyl alkane. This method of preparation permits the ready selection of the size of the alkane group by the selection of the corresponding alpha-omega-alkyl dihalide. For example, if a 4,4'-diaminodicyclohexylethane is desired, one may start with dichloroethane.

In addition the 4,4'-diaminodicyclohexyl alkanes may be prepared by other well-known syntheses. For example, 4,4'-diaminodicyclohexyl-propane was prepared by the following series of reactions:

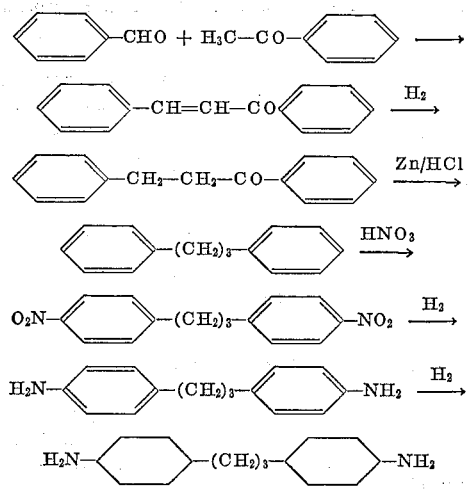

Suitable 4,4'-diaminodicyclohexyl alkanes include 4,4'-diaminodicyclohexyl-methane; 4,4'-diaminodicyclohexyl-ethane; 4,4'-diaminodicyclohexyl-propane; 4,4'-diamino-dicyclohexyl-butane and 4,4'-diaminodicyclohexyl-isobutane (4,4'-diaminodicyclohexyl - methyl - propane). The increase in the length of the alkane group reduces the melting point of the polyurea slightly. For example, the polyurea formed by condensing 4,4'-diaminodicyclohexyl-methane with urea has a melting point of 360° C. whereas the polyurea formed by condensing 4,4'-diamino-dicyclohexyl-propane has a melting point in the range 325–335° C.

Substitution of one of more alkyl groups for one or more hydrogen atoms on the cyclohexyl radical produces greater reductions in the melting point of the resulting polyurea. Typical substituted diamines of this type include 4,4'-diamino-3,3' - dimethyldicyclohexyl - methane; 4,4'-diamino - 3,3' - diethyldicyclohexyl - ethane; 4,4'-diamino-3,3',5,5'-tetramethyldicyclohexyl-methane and the corresponding alkyl - substituted diaminodicyclohexyl-ethane and-propane derivatives. Substitution of a methyl group in the 3,3' position lowers the melting point of the plyurea nearly 100° as compared with the polyurea from the unsubstituted diamine. The substitution of an ethyl group rather than a methyl group in the 3,3' position lowers the melting point another 5–10° C. However, the substitution of alkyl groups in all four of the positions seems to give no further reduction in melting point of the resulting polyurea than the substitution of alkyl groups in the two ortho positions.

A significant further melting point reduction can be achieved by the N alkylation of the diaminodicyclohexyl alkane. The polyurea formed by condensing N,N'-dimethyl 4,4'-diaminodicyclohexyl-methane with urea has a melting point of only 120–130° C. as compared with the melting point of 360° C. for the polyurea formed by condensing 4,4' - diaminodicyclohexyl - methane with urea. While the melting point of 120–130° C. is too low for most purposes, a wide range of melting points may be obtained by using a mixture of alkylated diamines and non-alkylated diamines, in which case, it appears, that the melting point of the resulting polyurea is directly and linearly proportional to the mole percent of the two diamines in the mixture. For example, in the case of polyureas formed by condensing the diamine with urea, it has been found that whereas the polyureas formed using only N,N'-dimethyl, 4,4'-diaminodicyclohexyl-methane as the diamine, has a melting point of about 120° C. and the polyurea formed using only 4,4'-diaminodicyclohexyl-methane as the diamine has a melting point of about 360° C.

The polyureas formed using an equal mole percent mixture of the two diamines has a melting point of about 220° C.; the polyurea formed using 40 mole percent of the N,N'-dimethyl substituted and 60 mole percent of the N,N' unsubstituted has a melting point of about 260° C., and the polyurea formed using 25 mole percent of the N,N'-dimethyl substituted and 75 mole percent of the N,N' unsubstituted diamine has a melting point of about 300° C. Instead of mixing a completely alkylated diamine with a completely non-alkylated diamine, these same results can be obtained by using a partially alkylated diamine.

Besides the diaminodicyclohexyl alkanes, other alicyclic diamines appear to be useful. Such other diamines include diaminodicyclohexane (e.g. diaminodicyclohexyl-alkane where the chain length of the alkane group is 0); diaminodicyclohexyl-cyclohexane (where an alicyclic group is substituted for the alkane) and dicyclohexyl diamines where a hereto atom such as

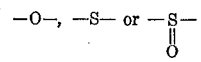

is used to link the two cyclohexyl groups (e.g., 4,4'-diamino-dicyclohexyl-ether, 4,4'-diamino - dicyclohexyl-sulfide, and 4,4'-diamino-dicyclohexyl-sulfoxide).

In forming the polyurea by condensing the alicyclic diamine with urea, the reaction conditions are such that the resulting polymer is easily separated from the reaction mixture and the course of the reaction which results in the liberation of ammonia can easily be followed by the quantitative determination of the quantity of liberated ammonia with hydrochloric acid. In general, the reaction may be carried out by heating equal molar amounts of the alicyclic diamine and urea either with or without the presence of a solvent in an oxygen-free atmosphere for a period of 2½ to 8 hours at a temperature of between about 150° C. to 300° C. and continuing the reaction until the liberation of ammonia has ceased. The polymer is separated from the reaction mixture by precipitation in a non-solvent organic liquid such as acetone or methanol.

The reaction may be accelerated and the reaction time shortened, if desired, by the addition of small amounts of mineral acids or acidic salts to the reaction mixture. It may also be desirable to terminate the polycondensation reaction at some predetermined degree of polymerization. A variety of materials may be used to terminate the reaction by acting as chain stoppers. These include the addition of an excess of the reacting alicyclic diamine; the addition of an excess of urea; or the addition of a monofunctional compound which forms stable reaction products with amino groups such as mineral acids, carboxylic acids, acid chlorides, acid anhydrides, and monofunctional isocyanates.

While the reaction can be carried out in the absence of a solvent for the reaction mixture, it is preferable to conduct the reaction in the presence of such a solvent. Suitable solvents include phenol, the cresols, and the xylenols. m-Cresol is especially suitable.

As pointed out above, the presence of oxygen should be excluded from the reaction. This means that the ingredients used in the reaction should be free of occluded oxygen and that the reaction be carried out either in vacuum or in the presence of an inert gas such as nitrogen, argon, carbon dioxide, oxygen-free steam, or the like.

The reaction may be carried out either as a batch process, a semi-continuous process, or a continuous process in and conventional processing equipment. The processing equipment should include a source of heat capable of heating the reaction mixture rapidly to the reaction temperature which is in the range of 150° C. to about 300° C. Since the reaction is somewhat exothermic, some provision should be made for removing the excess heat from the reaction mixture, especially if a large volume reaction vessel is used.

Since an excess of either the alicyclic diamine or urea will terminate the polycondensation reaction, it is important that an equal molar amount of each of these reactants be used. Since most of the alicyclic diamines will form a crystalline addition compound with urea in the mole ratio 1:1, it is frequently convenient to first prepare this addition compound and add the addition compound to the reactor rather than the separate reactants. Such an addition compound may be formed in a suitable solvent such as water or alcohol.

A convenient way of purifying the finished polyurea polymer is by dissolving the polymer, if it is not already in solution, in a hot solvent such as m-cresol and precipitating the polymer from the solution by the addition of a precipitant such as acetone or methanol. When so precipitated, the polymer forms a fine powder or a flock which can be separated readily from the liquid by filtering or centrifuging and can be rewashed or reprecipitated as desired. The resulting dry powder can be used directly or can be formed into pellets by extrusion techniques.

The polyureas formed by the polycondensation of alicyclic diamines with urea in accordance with the following examples are all tough, hard thermoplastic polymers. These polymers can be handled in conventional apparatus for thermoplastic resins such as extruders, injection molding machines, platen presses and the like to form finished articles of the desired shape. While the articles so formed have a high degree of strength, the strength of the article can be further increased by conventional cold drawing techniques. Typically, cold drawing is used when threads or filaments are produced by extrusion and when carried out on such threads or filaments at temperatures below the melting point of the polymer, produces threads or fibers suitable for use in textiles.

Polyurea polymers formed from alicyclic diamines have a strong resistance to attack in the presence of water, alkalis, weak acids, and almost all organic liquids. These polymers are soluble in phenol and related compounds such as cresols and form highly satisfactory coatings from such solutions. The polymers are subject to degradation in the presence of strong acids.

The following examples are typical of the preparation of polyureas by condensation of alicyclic diamines with urea. In each case, the melting point was determined in an open capillary tube and is uncorrected. The recorded viscosities were measured in an Ostwald viscometer as a 1% solution in m-cresol at 20°C. The value reported is the relative viscosity and is determined by dividing the flow time for the solution by the flow time in the given viscometer of pure m-cresol at 20° C.

*Example I*

63 grams of 4,4'-diaminodicyclohexyl-methane and 18 grams of urea were added to a mixture of 500 grams by weight m-cresol and 100 grams by weight of water in a stainless steel vessel provided with a stirrer. The reaction mixture was gradually heated to a temperature of 200° C. and the head space of the vessel was continuously rinsed with nitrogen to prevent the contamination of the reaction mixture with oxygen. The reaction was continued for a period of four hours during which time the ammonia formed by the reaction, the water and some 300 grams of m-cresol were distilled off.

The remainder, a highly viscous solution, was poured into 2,000 grams of methanol maintained at a temperature of 60–80° C. The polyurea precipitated from the methanol in colorless flocks and was centrifuged to free the flock of the liquid. The polymer was then suspended in a large excess of methanol and was boiled under reflux for three hours in order to remove any residual m-cresol. After another centrifugng, a pure colorless polyurea polymer was obtained having a melting point of 360° C. The yield was 85% of theoretical and the relative viscosity was 2.25.

*Example II*

266 grams of 4,4'-diamino 3,3',5,5'-tetramethyldicyclohexylmethane and 60 grams of urea were added to a mixture of 2,000 grams of m-cresol and 600 grams of water contained in a stainless steel reactor provided with a stirrer and heated to a temperature of 225° C. under an atmosphere of nitrogen. The reaction was continued approximately 4 hours during which time the liberated ammonia, the water and 1,000 grams of the cresol were distilled off. The residual highly viscous liquid was cooled down slightly and poured into 10,000 grams of methanol. The flocky precipitated polyurea after washing with methanol and drying showed a melting point of 270–280° C. The yield was 260 grams or 89% of theoretical. The relative viscosity was 1.42.

*Example III*

238 grams of 3,3'-dimethyl-4,4'-diaminodicyclohexyl-methane and 60 grams of urea were added to 2,500 grams of m-cresol in a stainless steel reaction vessel provided with a stirrer and heated gradually to a temperature of 200° C. under an atmosphere of nitrogen. After three hours, the temperature in the reaction vessel was raised to 250° C. and the reaction was continued for another two hours. During this time, 2,000 grams of m-cresol were distilled off together with the liberated ammonia. After cooling, the viscous remaining solution was poured with stirring into 10,000 parts of methanol. The polyurea polymer was deposited in the form of flakes and could be easily separated by filtration. After repeated boiling with methanol and drying, it showed a melting point of 260–270° C. The yield was 225 grams, corresponding to 85% of the theoretical. The relative viscosity was 1.40.

*Example IV*

238 grams of 4,4'-diaminodicyclohexyl-propane and 60 grams of urea was added to 2,500 grams of m-cresol in a stainless steel reaction vessel provided with an inert atmosphere. The mixture was heated for 30 minutes at a temperature of 200° C., 30 minutes at a temperature of 220° C., and finally for a period of 2 hours at 260° C. During the reaction, 1500 parts of m-cresol were distilled off. After the completion of the reaction, the warm solution was poured into 400 parts of acetone. The polyurea was precipitated in the form of a white powder which, after boiling with methanol and drying, had a melting point of 325–335° C. The yield was 250 grams which corresponds to 95% of the theoretical. The relative viscosity was 1.2.

*Example V*

266 grams of 3,3'-diethyl-4,4'-diaminodicyclohexyl-methane and 60 grams of urea were added to 2,500 grams of m-cresol in a stainless steel container provided with a gas inlet tube and a reflux condenser. The contents were heated gradually to a temperature of 200° C. in a nitrogen atmosphere. After the reaction had proceeded three hours, the temperature was raised to 250° C. and continued for an additional 3 hours. During this time, 1,500 grams of m-cresol were distilled off. After the reaction was completed, the cooled viscous solution was agitated with 5,000 parts of methanol. The polyurea was precipitated in the form of white flakes and showed after repeated boiling with methanol a melting point of 255–260° C. The yield was 285 grams which corresponds to 97.5% of the theoretical value. The relative viscosity was 1.45.

*Example VI*

In the apparatus described in Example V, 238 grams of 4,4'-dimethylaminodicyclohexyl-methane and 60 parts of urea were added to 2,500 grams of m-cresol and heated for 30 minutes at a temperature of 170° C. in an atmosphere of nitrogen. After the evolution of ammonia had ceased, the temperature was raised to 220° C. and 2,000 grams of m-cresol were distilled off in an additional 4 hours. Thereafter the reaction mixture was heated to a temperature of 250° C. for one hour under a vacuum of 0.01 mm. mercury and the remainder of the m-cresol was distilled off. The resulting polyurea polymer had a glassy appearance with a melting point of 110–130° C. The yield was quantitative and the relative viscosity was 1.2.

*Example VII*

105 grams (0.5 mole) of 4,4'-diaminodicyclohexyl-methane, 95 grams (0.4 mole) of 4,4'-dimethylaminodicyclohexyl-methane and 54 grams (0.9 mole) of urea were added to 1,500 grams of m-cresol and heated to a temperature of 180° C. for 30 minutes in the presence of an atmosphere of nitrogen. The reaction mixture was then maintained at a temperature of 200° C. for an additional 30 minutes and finally the temperature was raised to 240° C. for a period of 2 hours during which time the distilled m-cresol was refluxed. Finally the reaction was maintained at a temperature of 240° C. for an additional 2 hours without the reflux thereby permitting 1,200 grams of m-cresol to distill off. The cooled viscous solution was poured into 2,000 grams of methanol. The polyurea polymer was precipitated as a white powder which, after repeated boilings with fresh methanol and drying, had a melting point of 230–250° C. The yield was 190 grams which corresponds to 85% of the theoretical and the relative viscosity was 1.51.

The experiment in Example VII was repeated using other mole ratios of 4,4'-diaminodicyclohexyl-methane and 4,4'-dimethylaminodicyclohexyl-methane. When equal molar proportions were used, the melting point of the resulting polymer was 205–250° C. and the relative viscosity was 1.65. Where the molar proportion of 4,4'-diaminodicyclohexyl-methane to 4,4'-dimethylaminodicyclohexyl-methane was 1.5 to 1, the resulting polymer had a melting point of 260–290° C. with a relative viscosity of 1.45. At a 2:1 molar ratio, the melting point was 280–300° C. and the relative viscosity was 1.48. At a molar ratio of 3:1, the melting point was 300–310° C. at a relative viscosity of 1.70.

*Example VIII*

As an example of bulk polymerization, 270 grams of 3,3'-diethyl-4,4'-diaminodicyclohexyl-methane and 60 grams of urea were thoroughly mixed in a flask provided with a gas inlet tube and a reflux condenser. The components were heated in a nitrogen atmosphere to 150° C. at which temperature the rapid evolution of ammonia began. After 30 minutes, the temperature was raised to 180° C. for an additional 30 minutes and finally raised to 260° C. for a period of 3–4 hours. At the end of this period, 2,000 grams of m-cresol were added and the mixture was refluxed until the polyurea resin was dissolved. After cooling, the solution was poured into 6,000 parts of methanol. The polyurea was obtained as a white powder which after boiling several times with methanol and drying had a melting point of 255–260° C. The yield was 260 grams which corresponds to 89% of the theoretical value.

We claim:

1. A process for preparing a high molecular weight, fiber forming, essentially linear, thermoplastic polyurea polymer which comprises heating equimolar amounts of urea and an alicyclic diamine at a temperature ranging between about 150° C. and 300° C. for a period of about 2.5 to 8 hours in an oxygen-free atmosphere, continuing the reaction until the liberation of ammonia has ceased, and recovering the resulting polymer, said diamine having the structure consisting of

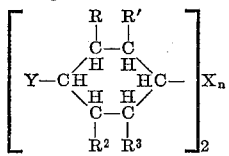

where R, R', R², and R³ represent substituents selected from the group consisting of hydrogen and a lower alkyl radical having 1 to 4 carbon atoms, $n$ has one of the values 0 and 1, X represents a member selected from the group consisting of alkylene radicals having 1 to 4 carbon atoms, a divalent hetero atom selected from the group consisting of

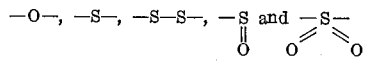

and a cyclohexyl radical having the structure

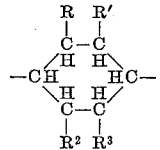

where R, R', R² and R³ represent a member of the aforementioned substituents, and Y represents the group

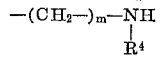

where R⁴ represents a member selected from the group consisting of hydrogen and a lower alkyl radical having 1 to 4 carbon atoms, and $m$ has one of the values 0, 1, 2 and 3.

2. A process according to claim 1 wherein the reaction is carried out in the presence of an inert gas.

3. A process according to claim 1 wherein the diamine is 4,4'-diaminodicyclohexyl-methane.

4. A process according to claim 1 wherein the diamine is 4,4'-diamino-3,3',5,5'-tetramethyldicyclohexyl-methane.

5. A process according to claim 1 wherein the diamine is 3,3'-dimethyl-4,4'-diaminodicyclohexyl-methane.

6. A process according to claim 1 wherein the diamine is 4,4'-diaminodicyclohexyl propane.

7. A process according to claim 1 wherein the diamine is 3,3'-diethyl-4,4'-diaminodicyclohexyl methane.

8. A process according to claim 1 wherein the diamine is 4,4'-dimethylaminodicyclohexyl methane.

9. A process according to claim 1 wherein the diamine is comprised of a mixture of 4,4'-dimethylaminodicyclohexyl methane and 4,4'-diaminodicyclohexyl methane.

References Cited by the Examiner

UNITED STATES PATENTS

| | | | |
|---|---|---|---|
| 2,181,663 | 1/1939 | Martin | 260—77.5 |
| 2,595,400 | 5/1952 | Maynard | 260—77.5 |
| 2,709,694 | 5/1955 | Dietrich | 260—77.5 |
| 2,828,291 | 3/1958 | Saunders | 260—77.5 |
| 2,888,438 | 5/1959 | Katz | 260—77.5 |
| 2,975,157 | 3/1961 | Katz | 260—77.5 |

FOREIGN PATENTS

| | | |
|---|---|---|
| 925,496 | 7/1949 | Germany. |
| 535,139 | 3/1941 | Great Britain. |

DONALD E. CZAJA, *Primary Examiner.*

HAROLD N. BURSTEIN, LEON J. BERCOVITZ,
*Examiners.*